US006196522B1

(12) United States Patent
Yuen et al.

(10) Patent No.: US 6,196,522 B1
(45) Date of Patent: Mar. 6, 2001

(54) GEOMETRIC LOCKOUT COUPLER

(75) Inventors: Kaye Kit-Han Yuen, Minneapolis; Oliver Murphy, III, St. Paul, both of MN (US)

(73) Assignee: Ecolab, Inc., St. Paul, MN (US)

( * ) Notice: Subject to any disclaimer, the term of this patent is extended or adjusted under 35 U.S.C. 154(b) by 0 days.

(21) Appl. No.: 09/285,382

(22) Filed: Apr. 2, 1999

(51) Int. Cl.[7] .............................. F16L 37/28; B67D 3/04

(52) U.S. Cl. ...................... 251/149.5; 251/144; 251/351; 222/501; 222/520

(58) Field of Search .................................... 251/325, 351, 251/149.5, 221, 144; 137/606; 222/501, 519, 520

(56) References Cited

U.S. PATENT DOCUMENTS

| | | | | |
|---|---|---|---|---|
| 1,912,304 | * | 5/1933 | Phillips | 251/351 |
| 2,606,736 | * | 8/1952 | Ferm | 251/325 |
| 4,696,326 | * | 9/1987 | Sturgis | 251/149.6 |
| 5,096,158 | * | 3/1992 | Burdick et al. | 251/351 |
| 5,449,145 | * | 9/1995 | Wortich | 251/325 |
| 5,971,019 | * | 10/1999 | Imai | 137/614.04 |

* cited by examiner

*Primary Examiner*—Kevin Shaver
*Assistant Examiner*—Eric Keasel
(74) *Attorney, Agent, or Firm*—Merchant & Gould P.C.

(57) ABSTRACT

Disclosed is a geometric lockout coupler assembly comprising a probe capable of reversibly moving between an open position and a closed position, the open position permitting fluid to pass through the probe; and a bung cup sized and configured to accept the probe. The probe further comprises a geometric configuration which cooperates with the complementarily shaped bung cup to allow fluid to flow through the probe while not permitting other probes to cooperate with the bung cup.

21 Claims, 9 Drawing Sheets

GEOMETRIC LOCKOUT COUPLER

FIELD OF THE INVENTION

The invention relates to an apparatus used for dispensing chemicals. The invention is especially suited for dispensing incompatible chemicals, which are defined as liquid chemicals that when mixed can result in creation of an undesirable reaction by-product. The invention relates to unique geometric lockout couplers which can be used to dispense incompatible chemicals without accidental mixing or other inappropriate contact.

BACKGROUND OF THE INVENTION

Many processes such as laundry washing make use of more than one chemical. Such chemicals can include organic surfactants, nonionic rinse aids, acid compositions, alkaline compositions, chlorine bleach compositions, alkaline materials and a variety of other cleaning or treating materials. Often such materials have substantial functionality when used appropriately in a use locus, however, if mixed with another incompatible chemical, such a mixture can result in the production of an undesirable reaction by-product that can interfere either with the operation of the use locus, the operation of the dispenser or can interfere with or ruin the substrate present in the machine such as ware, laundry, textile or other materials. Further, some chemicals if mixed can be explosive or toxic. Mixing acid and a source of chlorine can result in the release of chlorine gas. Blending certain chemicals can also result in the release of hydrogen gas which can also have explosive consequences.

The prior art generally dispenses a liquid chemical from a source reservoir through a line to a pump which is then directed to either a common or a separate manifold that ends in a use locus. Connecting an inappropriate source of chemical to an incorrect line when using such prior art systems can result in contacting reactive liquids in the dispenser or use locus with the production of an undesirable reaction by-product that can be damaging or hazardous.

A substantial need exists for a coupler apparatus that can prevent inappropriate contact between incompatible chemicals, thereby preventing the concomitant production of a harmful by-product.

SUMMARY OF THE INVENTION

The invention is a geometric lockout coupler assembly including a probe capable of reversibly moving between an open position and a closed position, where the open position permits fluid to pass through the probe; and a bung cup sized and configured to accept the probe. The probe further comprises a geometric configuration which cooperates with the complementarily shaped bung cup to allow fluid to flow through the probe while not permitting other probes to cooperate with the bung cup.

In this, complementarily shaped is intended to mean that the bung cup has a unique geometric configuration which permits it to completely receive a probe with the correct geometric configuration while not accepting probes with other geometric configurations. For example, FIG. 9 shows a bung cup which is complementarily shaped to the probe seen in FIG. 4. FIGS. 12 and 13 show another probe and complementarily shaped bung cup. As described later, these respective probes and matching bung cups include particular geometric configurations which prevent accidental mixing of incompatible chemicals caused by attaching a supply line to the incorrect supply drum or other container.

The invention is also found in a geometric lockout coupler assembly comprising a probe comprising an inner probe and an outer probe, and a complementarily shaped bung cup. The inner probe and outer probe are capable of reversibly moving axially in relation to each other between an open position, where fluid is permitted to pass through the probe, and a closed position. The inner probe further comprises a hollow cylinder through which fluid may pass, and one or more windows which permit entry of said fluid when the probe is in the open position. The probe further comprises a geometric configuration which cooperates with the complementarily shaped bung cup to permit insertion of the probe into the bung cup.

The invention is further found in a geometric lockout coupler comprising a probe comprising an inner probe and an outer probe and a complementarily shaped bung cup sized and configured to accept the probe. The inner probe comprises a hollow cylinder through which fluid may pass, and one or more windows which permit entry of said fluid; and further comprises a plurality of slider pegs. The outer probe comprises a plurality of slider tracks which cooperate with said slider pegs to permit the outer probe to simultaneously move axially and radially on the inner probe, thereby reversibly opening said window to permit fluid to pass through the probe. The outer probe further comprises a plurality of locking pegs. The probe further comprises a geometric configuration comprising a plurality of indentations which cooperate with the complementarily shaped bung cup comprising a plurality of protrusions to permit complete insertion of the probe into the bung cup.

The invention is also found in a geometric lockout bung cup comprising a hollow cylinder comprising a first end suitable for attachment to a drum bung; wherein the first end comprises a plurality of lockout tracks preferably arranged 180° apart radially; and a second end suitable for attachment to a dip tube. The second end comprises a collar which limits penetration depth of the dip tube used with the bung cup. Also included at the second end is a plurality of protrusions which are arranged at predetermined radial positions in relation to said lockout tracks.

In another embodiment, the invention is found in a geometric lockout coupler assembly comprising a probe comprising an inner probe, an outer probe and a bung cup. The probe has a first end and a second end; the first end comprising an engagement surface and a fluid exit point; and the second end comprising a fluid entrance point. The inner probe comprises a hollow cylinder through which fluid may flow, and one or more windows which permit entry of said fluid, wherein said windows of said inner probe correspond with the fluid entrance point.

The inner probe further comprises a plurality of slider pegs while the outer probe comprises a plurality of slider tracks which cooperate with said slider pegs to permit the outer probe to simultaneously move axially and radially on the inner probe, thereby reversibly opening said windows to permit fluid flow through the probe. The outer probe further comprises a plurality of locking pegs. The probe further comprises a geometric configuration comprising a plurality of indentations which cooperate with the complementarily shaped bung cup comprising a plurality of protrusions to permit complete insertion of the probe while not permitting other probes to cooperate with said bung cup.

The invention can also be found in a system for dispensing incompatible chemicals. The system comprises a plurality of probes, each probe having an open position and a closed position, wherein the open position permits fluids to pass through the probe, each probe having a lockout portion having a distinct geometric configuration; and a plurality of bung cups, wherein each bung cup is configured to completely receive the lockout portion of only a matching probe selected from the plurality of probes, wherein the bung cup is further configured to permit the matching probe to be turned to the open position.

DETAILED DISCUSSION OF THE INVENTION

Figure 1:
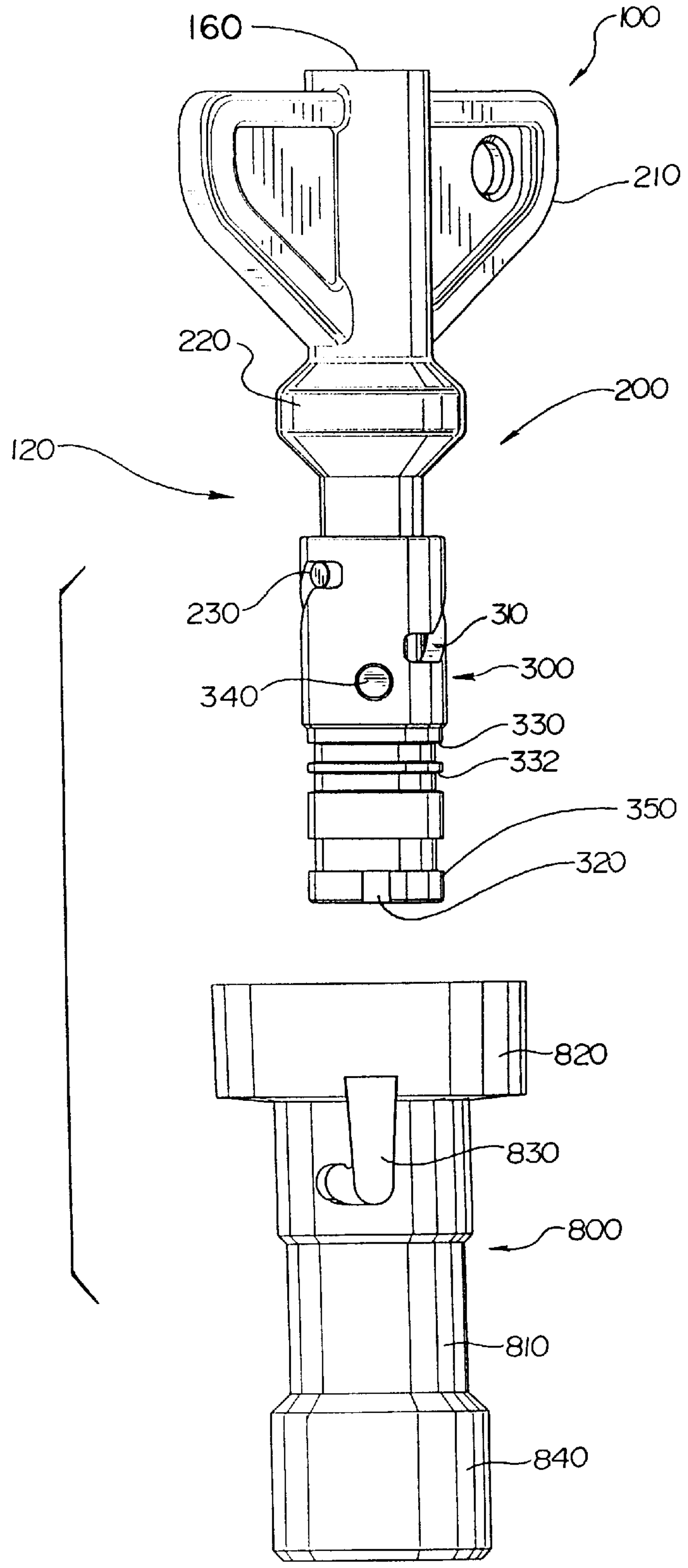
FIG. 1 is an exploded view of the geometric lockout coupler of the invention. The coupler includes an assembled probe, made of an inner probe and an outer probe, and a bung cup.

The lockout coupler of the invention can be used to dispense a chemical stream to a use locus such as a warewashing machine or laundry machine. The geometric lockout coupler of the invention includes a probe and a bung cup for receiving the probe, where the probe and bung cup cooperate to allow dispensing of liquid through the probe. The bung cup is typically seated in the bung of a container of the product to be dispensed using the system. The probe and bung cup are provided with a geometric configuration so that the probe will only cooperate with a specifically configured bung cup. Accordingly, a given probe can be inserted only into a specifically shaped bung cup. As a result, a system may be constructed where a given probe that is used to dispense a chemical, bleach, for example, cannot be inserted into a bung cup that is used to dispense an incompatible chemical, a souring agent, for example.

The probe is the male part of the coupling, whereas the bung cup is the corresponding female part. In one embodiment of the invention, the geometric configuration of the probe and bung cup includes matching indentations and protrusions. In this embodiment, each lockout coupling comprises a number of indentations on the probe and a number of matching protrusions on the bung cup. Preferably, a pair of axially opposed indentations are provided on the probe and a pair of axially opposed protrusions are provided on the bung cup, although other configurations are possible and contemplated by the invention. These indentations and protrusions can be rotated around the vertical axis in different couplings, thereby providing multiple mutually exclusive couplings by varying their axial relationship with the locking pegs present on the outer probe and the corresponding locking channels present on the bung cup.

Preferably, the indentations and protrusions are rotated radially around the vertical axis at 30° intervals. These angles define the relative position of the indentations on the probe (and corresponding protrusions on the bung cup) in relation to the locking pegs present on the probe (and corresponding locking channels in the bung cup). Preferably, each indentation and each protrusion are 180° opposed to the other indentation and protrusion, respectively. In such a system, six different couplers are provided where the probe and bung cup of each coupler operate only with each other, not with the five other probes and bung cups of the system. The six different couplers in such a system have protrusions and indentations at the following respective orientations to the corresponding locking pegs and locking channels: 0°, 30°, 60°, 90°, 120°, and 150°.

Many other geometrical configurations can be used with the invention and are contemplated by the invention. For example, a portion of the probe can be provided with an outer geometric shape, such as a circle, square, triangle or hexagon. In this embodiment, the complementarily shaped bung cup is provided with a portion to accept the outer geometric shape of the probe. Probes having a triangle shaped portion cannot be fully inserted into bung cups having a hexagon shaped receiving portion, for example.

Another possible geometric configuration of the probe involves the position of the locking peg on the probe. The distance between the locking peg and the top or bottom of the probe is varied. In a complementarily shaped bung cup, the configuration or length of the locking channels is varied to match the corresponding probe. Many other geometric configurations can also be used in conjunction with the invention. In addition, the probe and bung cups that are safe for use together can be color coded to allow easier identification.

Chemicals Dispensed

Examples of dispensed solutions that may be used with the geometric lockout couplers of the invention include solid, powdered and liquid detergents; thickened aqueous detergent dispersions, viscous aqueous detergents, strippers, degreasers, souring agents, alkali meta-silicates, alkali metal hydroxides, sequestering agents, enzyme compositions (lipolytic, proteolytic, etc.), threshold agents, dye, optical brightener, nonionic surfactant, anionic surfactant, fragrance, alkali carbonates, iron control agents, defoamers, solvents, cosolvents, hydrotropes, rinse aids, bleach, and/or fabric softeners. More specifically, in a laundry environment, detergent, bleach, souring agent, bluing agent, and fabric softener can be utilized sequentially with the geometric lockout couplers of the present invention. The souring agent is generally incompatible with the other products (e.g., the detergent is alkaline, the souring agent is acidic and the bleach is typically sodium hypochlorite). The ingredients in many other cleaning processes may also be incompatible. For example, changing the operable pH can occur or chemicals can react, thereby reducing or destroying cleaning properties.

Detailed Description of the Figures

FIG. 1 shows, in exploded fashion, components of the geometric lockout coupler of the invention. Coupler 100 includes a probe assembly 120 and a bung cup 800. The probe assembly 120 includes an inner probe 200 and an outer probe 300. In this view, the probe assembly 120 is closed so that liquid could not pass through the probe assembly 120.

The interaction between the inner probe 200 and outer probe 300 allows creation of a probe assembly 120 which does not require a spring-loaded, vacuum operated valve within the probe body. Such a valve often has metal parts that contact the chemicals being dispensed, and is therefore susceptible to corrosion and clogging. Instead, the inner probe 200 and outer probe 300 cooperate to reversibly open and close windows present on the inner probe 200. The open position can be seen in FIG. 5, while FIG. 1 shows the closed position. As described later, the act of inserting and rotating the probe assembly 120 (in its closed position) into the bung cup 800 both engages the unique lockout geometry and places the probe 120 into an open position, thereby allowing fluids to pass through.

Figure 14:
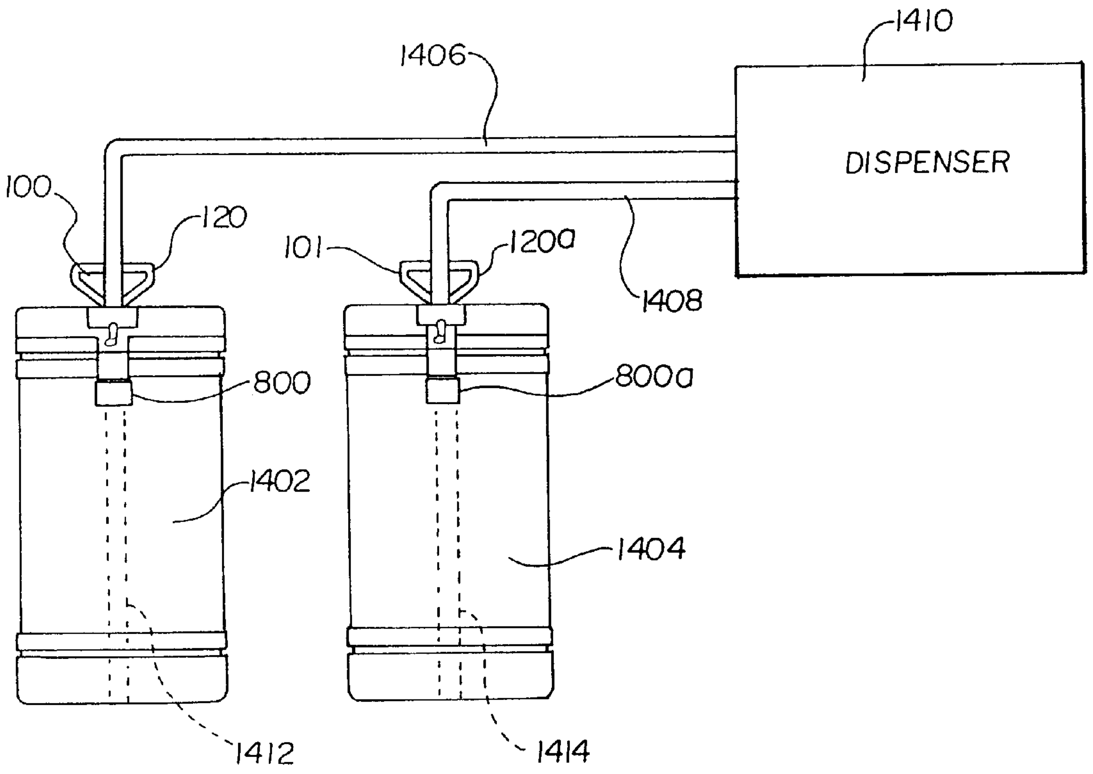
FIG. 14 shows two geometric lockout couplers of the invention used in combination to dispense several incompatible chemicals. For simplicity, this drawing only shows two couplers in use. The invention is not limited to such, however.

FIG. 14 illustrates an environment in which the geometric lockout couplers 100, 101 of the invention may be used. Two barrels 1402, 1404 are shown, each containing a solution to be dispensed. The barrels 1402, 1404 are connected to supply lines 1406, 1408, respectively, which lead to a dispenser that will supply the solutions to a use locus. Two geometric lockout couplers 100, 101 provide the means for connecting the barrels 1402, 1404 to the supply lines 1406, 1408.

Each lockout coupler 100 and 101 include a probe assembly 120 and 120*a*, respectively, and corresponding bung cups 800 and 800*a*. As discussed later, these pairs of probe assemblies 120, 120*a* and bung cups 800,800*a* prevent accidental connections between incompatible chemicals.

Figure 2:
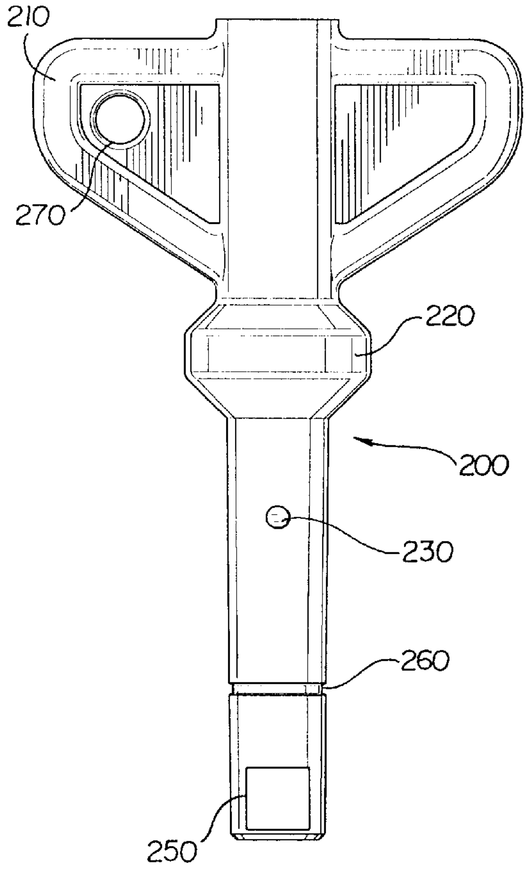
FIG. 2 is a perspective view of the inner probe shown in FIG. 1.

Now referring to FIGS. 1 and 2, inner probe 200 may have wings 210 for ease of use and to provide an engagement surface for a user. Slider pegs 230 (only one seen) serve to movably locate the inner probe 200 within the outer probe 300. The inner probe 200 also includes an upper end 160 of the inner probe 200, which may include a threaded aperture suitable for attaching various supply lines.

Figure 5:
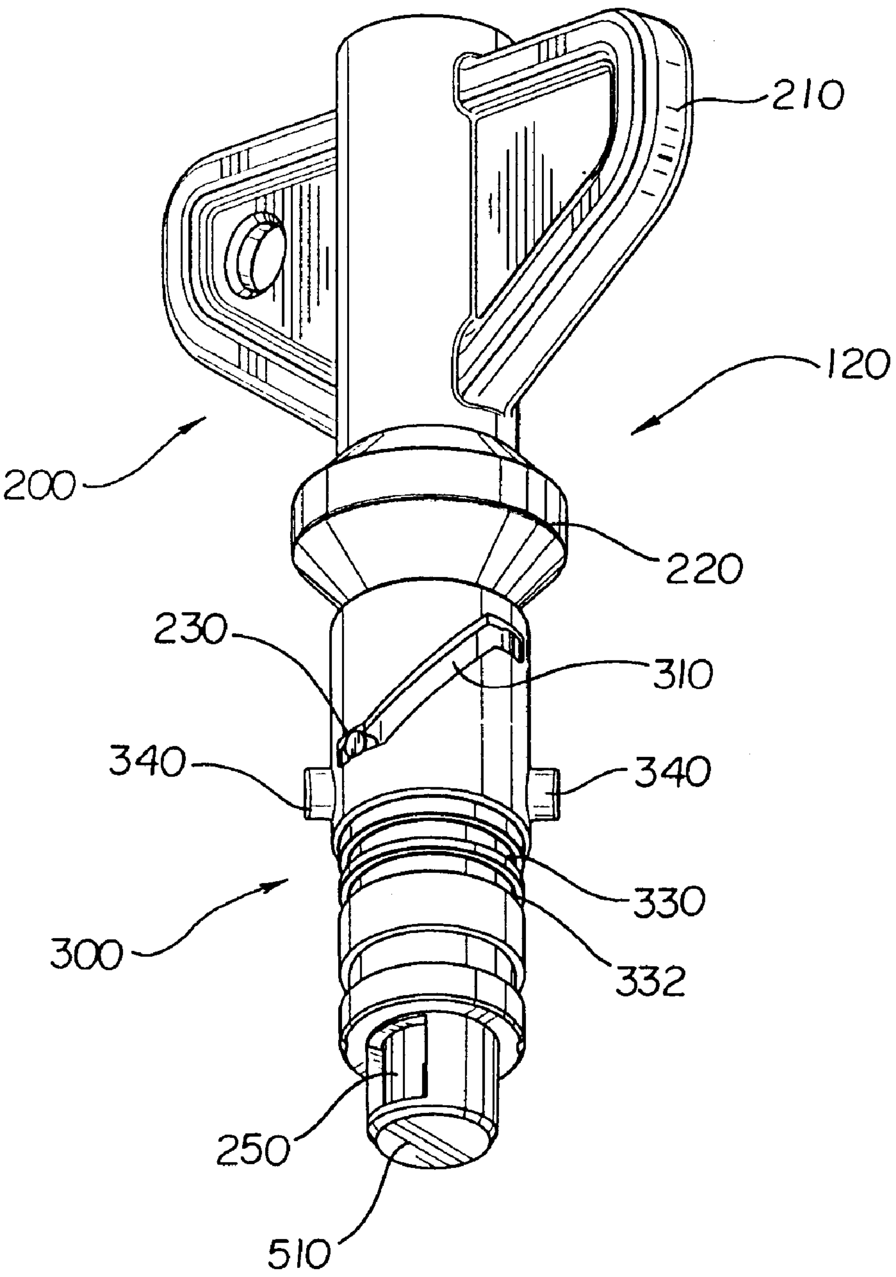
FIG. 5 is a perspective view of the combined inner and outer probes of FIG. 1 shown in its fully open position.
Figure 6:
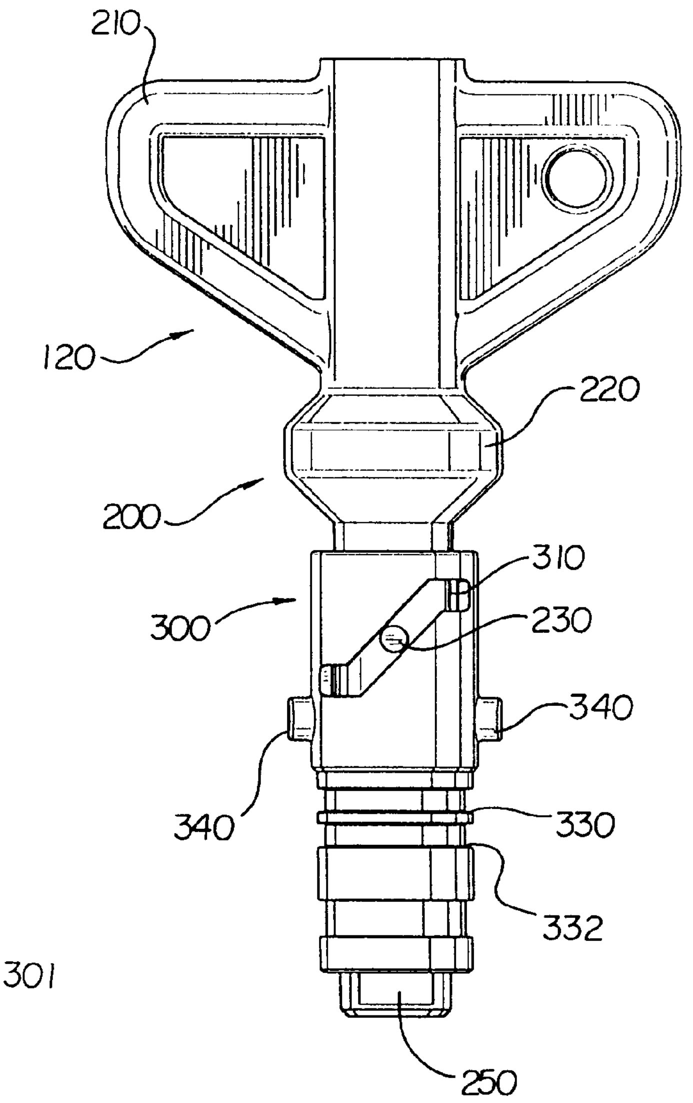
FIG. 6 is a side view of the partially opened combined probe of FIG. 1.

The outer probe 300 may include a slider track 310 which serves to movably locate the outer probe 300 on the inner probe 200, to move the probe between a closed position and an open position. FIG. 1 shows the closed position, while FIG. 5 shows the open position of the probe 120, and FIG. 6 shows a half-open position of the probe 120. Now referring again to FIG. 1, the outer probe 300 also may have a pair of O-ring grooves 330 and 332, respectively, which hold O-rings to provide a seal between the probe assembly 120 and the bung cup 800.

Figure 3:
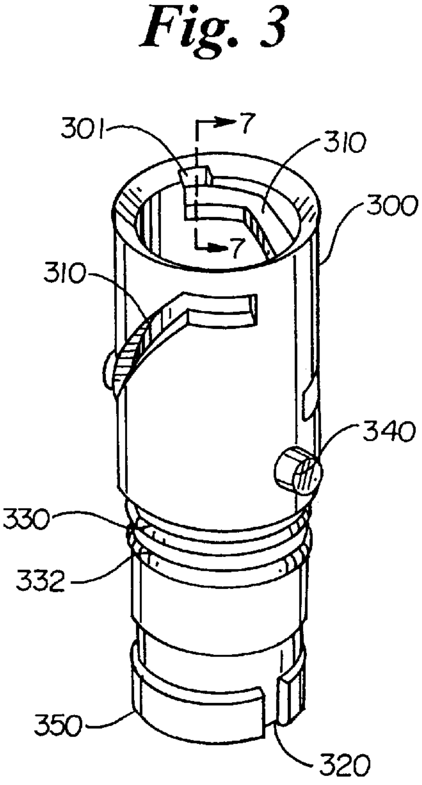
FIG. 3 is a perspective view of the outer probe shown in FIG. 1.

The outer probe 300, shown separately in FIG. 3, also includes locking pegs 340, that are received in locking channels 830 of the bung cup 800, and secure the probe 120 within the bung cup 800. Indentations 320 are present at lower end 350 of the outer probe 300. These indentations 320 are needed to allow the probe 120 to be fully inserted into the bung cup 800 because the inner surface of the bung cup 800 includes protrusions, in one preferred embodiment of the invention. The protrusions of the bung cup will be described with respect to FIGS. 9–11.

Now referring to FIG. 1, the bung cup 800 is typically mounted in the top of a barrel or other container which holds a liquid chemical which can be dispensed. Typically, the bung cup 800 can be adhered to a drum bung for ease of use. Drum bungs are often threaded for simple installation in a drum or other chemical containing container. The bung cup 800 can be glued to the drum bung, or can be attached via sonic welding.

The bung cup 800 includes a tubular body 810 and enlarged upper portion 820, which serves to accept the probe assembly 120, or male portion of the coupler. Locking channels 830 serve to accept the locking pegs 340 present on the outer probe 300. The first locking channel is shown on the front side of the bung cup 800 in FIG. 1. A second locking channel 830 is located on the opposite side of the bung cup 800 in this embodiment. Lower portion 840 is sized to accept an appropriately sized dip tube.

Figure 9:
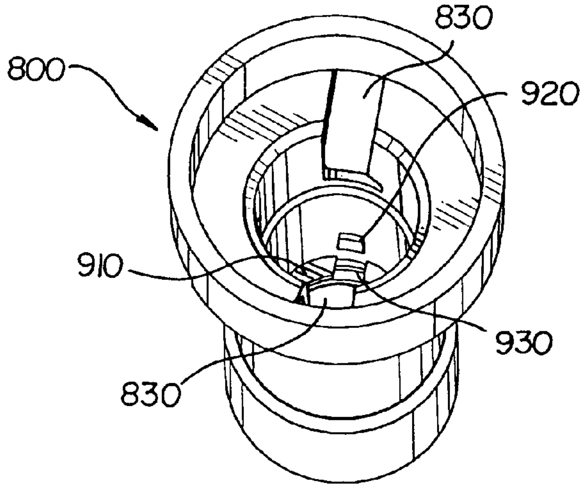
FIG. 9 is a perspective view of the bung cup of FIG. 1, showing the geometric relationship between the locking channels and lockout protrusions which cooperate to create the unique lockout geometry of the coupler assembly.
Figure 10:
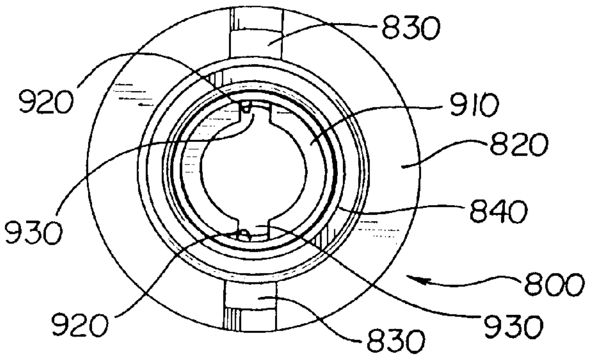
FIG. 10 is an end bottom view of the bung cup of FIG. 1.
Figure 11:
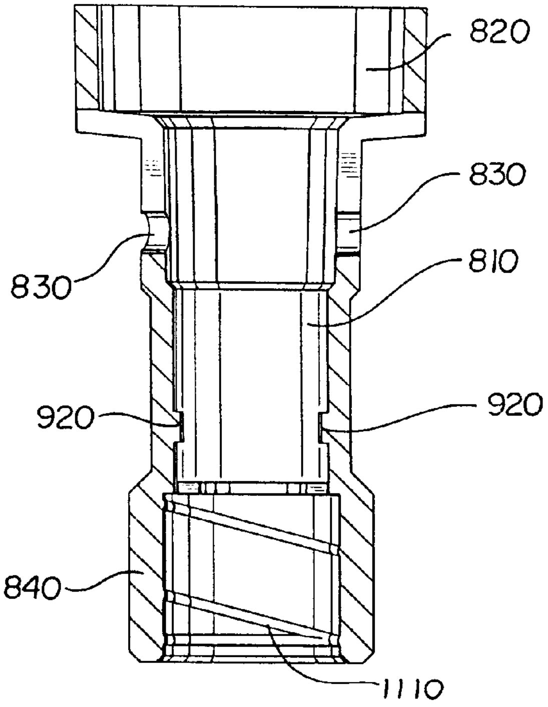
FIG. 11 is a cross-sectional view of the bung cup taken along line 11—11 of FIG. 8.

Preferably, lower portion 840 is provided with a thread or other structure on its inner surface to facilitate a friction fit with a dip tube 1412 (shown in FIG. 14). The preferred threading 1110 is illustrated in FIG. 11. However, the dip tube could also be secured to the bung cup by an appropriate attachment method, such as spin welding, ultrasonic welding or using adhesives, for example. The size of the dip tube can be determined by the flow rates necessary. A common dip tube size is a ⅝ inch inner diameter. FIG. 9 shows a collar 910 which serves to limit dip tube penetration.

FIG. 2 shows inner probe 200, including wings 210 for ease of use, and to provide a gripping and torque generating surface. One wing 210 may have a hole 270 for attaching an identifying tag or label to the probe 120. Slider pegs 230 (only one seen) serve to moveably locate the inner probe 200 within the outer probe 300. One slider peg 230 is shown on the front side of the inner probe 200, and a second slider peg 230 is located on the other side of the inner probe 200, opposite from the first slider peg. An O-ring groove 260 may hold an O-ring (not shown) while windows 250 (only one seen) permits liquid to flow through. The second window 250 is located directly behind the first window 250 shown in FIG. 2, so that the viewer can see through both windows 250 to the opposite side of the inner probe 200 in FIG. 2.

FIG. 3 shows outer probe 300. The outer probe 300 includes two slider tracks 310 which serve to movably locate said outer probe 300 on the inner probe 200. One slider track is shown, while the other slider track 310 is located on the opposite side of the outer probe 300. Locking pegs 340 and indentations 320 serve to help provide the necessary lockout geometry that is required to allow complete insertion into a bung cup.

Figure 4:
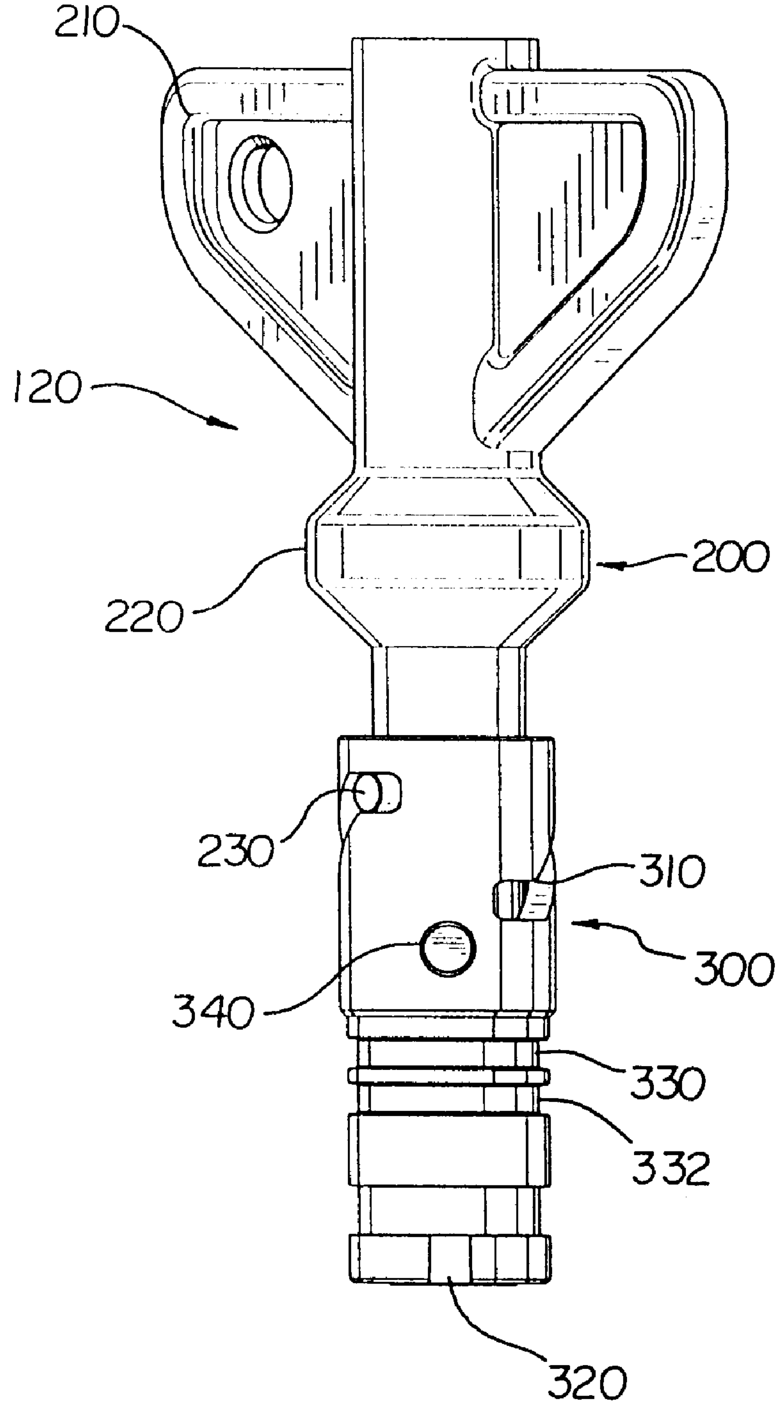
FIG. 4 is a side view of the combined inner and outer probes shown in FIG. 1. The probe is shown in its fully closed position.

FIG. 4 shows a combined probe assembly 120 including an inner probe 200 and outer probe 300. In this view, the probe is seen in its fully closed position. Slider pegs 230 serve to moveably locate the inner probe 200 via slider tracks 310 within the outer probe 300. In this view, slider peg 230 is seen in its upper, closed position. The locking pegs 340 and indentations 320 are in axial alignment with one another. It is this relationship, in cooperation with the placement of locking channels and protrusions present in the bung cup, which provides the unique geometric lockout feature of the couplers used in the dispenser of one embodiment of the invention. To mate with the illustrated probe configuration, the bung cup 800 will have lockout protrusions 920 in axial alignment with the locking channels 830, as illustrated in FIG. 9. The indentations 320 can be moved radially about the outer probe 300 to provide additional lockout geometries. Preferably, the indentations are located radially at multiples of 300 from alignment with the lockout pegs 340 in different couplers.

FIG. 5 shows the combined probe 120 in a fully open position so that fluid would be permitted to pass through the probe 120. In this drawing, inner probe 200 has been rotated downward into outer probe 300. Slider peg 230 has moved downward in slider track 310, to its lower, open position. In this position, windows 250, or fluid entrance openings, are revealed, which will allow fluid to flow through the combined probe when fully inserted into an appropriate bung cup. Also visible in FIG. 5 is inner probe bottom surface 510.

FIG. 6 shows the probe assembly 120 in a partially open position, as indicated by partially revealed window 250. Further, sliding peg 230 is in an intermediate position within slider track 310. As before, probe assembly 120 comprises an inner probe 200 and outer probe 300.

Figure 7:
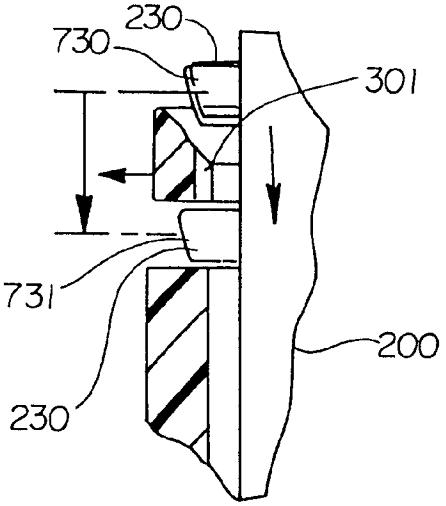
FIG. 7 is a fragmentary sectional detail taken along line 7—7 of FIG. 3 with additional components shown.

FIGS. 3 and 7 show outer probe 300, including the slider tracks 310. At the top of each slider track 310 is a sloped channel 301 which facilitates assembly of the inner probe 200 and outer probe 300 into the combined probe assembly 120. While only one sloped channel 301 is seen in FIG. 3, both slider tracks 310 may be equipped with sloped channel 301.

FIG. 7 is a fragmentary sectional view of the top portion of FIG. 3 showing the sliding peg 230 of the inner probe in two positions, before and after assembly of the inner probe 200 and outer probe 300 into the probe assembly 120. Position 730 represents slider peg 230 prior to insertion through sloped channel 301 into slider track 310 while position 731 represents the slider peg 230 after insertion.

The probe assembly 120 comprises two parts: an inner probe 200 and an outer probe 300. The two parts are made of thermoplastic material, but can also be made out of metal, using a die cast system. Preferably, the inner and outer probes are injection molded from glass filled polypropylene. The assemblies of the two parts come together to function as a probe that can be open and shut to allow product to flow through. The corresponding female portion, or bung cup 800, is preferably one piece and is preferably made from injection molding of high density polyethylene. These parts could also be machine milled from an appropriate plastic.

FIG. 9 shows collar 910, which serves to limit dip tube penetration. The collar 910 includes notches 930 (only one is visible in this Figure), which are necessary in the injection molding process to ensure proper formation of the protrusions 920. If the bung cup were milled, the notches 930 may not be necessary.

The inner probe is constructed with two slider pegs 230, an O-ring groove 260 and two windows 250. Slider pegs 230 are snapped into slider track 310 of the outer probe 300. Windows 250 allow fluid to flow through when the probe is opened. The O-ring groove 260 is for an O-ring to create a tight seal between the inner probe 200 and outer probe 300. The outer probe 300 is constructed with a slider track 310, locking pegs 340, two O-ring grooves 330 and 332, and a pair of indentations 320. Slider track 310 guides inner probe 200 to protrude a certain distance to open the windows 250 to allow product to flow through. Locking pegs 340 lock the combined probe into place during use. For assembly, an O-ring is placed on the inner probe 200; the outer probe 300 is placed over the inner probe 200, snapping the slider pegs 230 into the slider track 310. A spring or resilient member (not shown) may be used between the inner probe 200 and outer probe 300 to facilitate the opening and closing of the combined probe to bias the probe assembly 120 into the closed position.

While the inner probe 200 and outer probe 300 cooperate with the bung cup 800 to sealably connect a supply line with the dip tube present within the chemical storage container, the probe assembly 120 may be configured to permit venting of the storage container. Locking channels 830 may permit atmospheric contact between the chemical container and the ambient environment. Air or other gases can pass through the locking channels 830 into the upper portion 820 of the bung cup 800 and then can pass out of the bung cup 800 around enlarged probe portion 220. This venting feature allows air to pass into the drum or other chemical storage container as liquid is pulled out, thereby maintaining atmospheric pressure within the container. Further, this also allows the chemical itself to vent to atmosphere. Certain liquid chemicals, such as bleach, for example, have substantial vapor pressures and therefore need to be vented in order to maintain a constant pressure within the container.

FIG. 9 is a perspective view which shows a portion of the interior of the bung cup 800. Protrusions 920 (only one seen) are included on the interior surface of the bung cup 800. The purpose of the protrusions 920 is to prevent the bung cup from being usable with any probes except probes that have correctly positioned mating indentations 320 at their lower ends. The protrusions 920 are axially aligned with the locking pegs 340 in the illustrated embodiment. Without such indentations 320, a probe assembly would be stopped by protrusions 920 from being fully inserted into bung cup 800.

Figure 8:
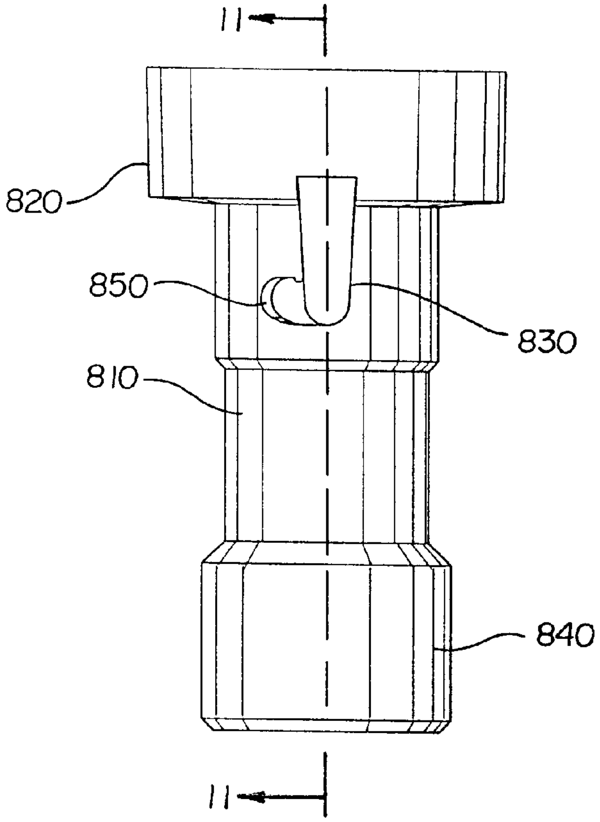
FIG. 8 is a side view of the bung cup of FIG. 1.

To operate, the combined probe slides into bung cup 800, where locking pegs 340 are guided along bung cup locking channels 830. The indentations 320 of the outer probe 300 slides past the lockout protrusions 920, and the probe is turned clockwise until it cannot turn anymore. As the combined probe is turned, inner probe 200 slides down sliding track 310 along slider pegs 230, exposing windows 250. Once windows 250 are exposed, the latter part of the turn locks the probe into place. The latter part of the clockwise turn urges the locking pegs 340 of the probe 120 into an over-center portion 850 of locking channels 830, illustrated in FIG. 8. The latter part of the turn also moves indentations 320 downward beyond the protrusions 920 and radially past protrusions 920, thereby sealing the probe assembly 120 within the bung cup 800.

FIG. 11 is a cross-sectional view of the bung cup 800, including the upper portion 820, the middle portion 810, and the lower portion 840.

Figure 12:
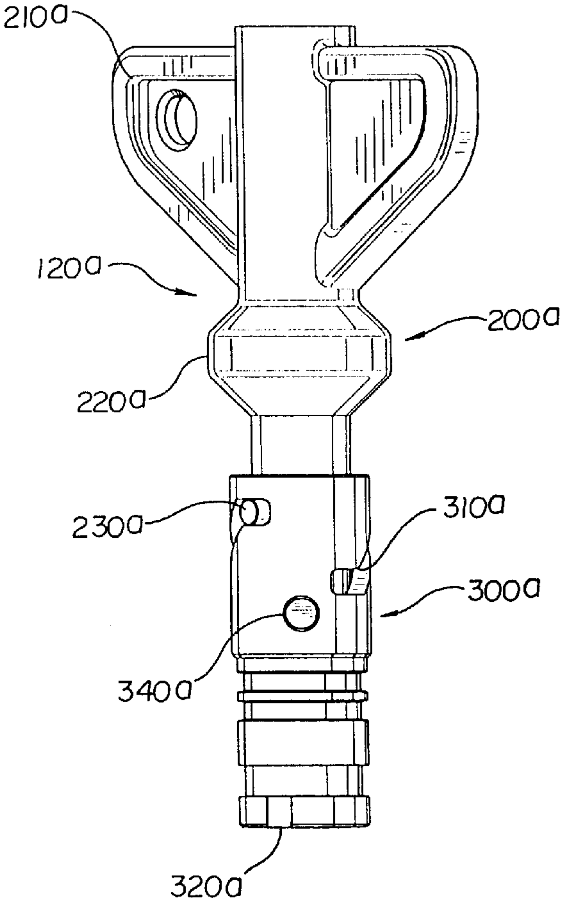
FIG. 12 is a side view of an embodiment of the probe where the lockout indentations are 30° apart from axial alignment with the locking pegs.
Figure 13:
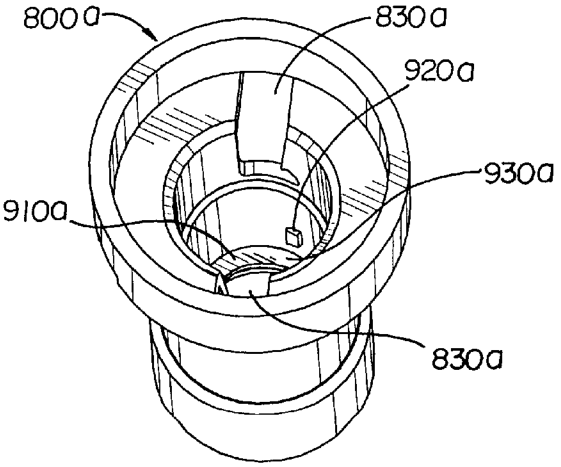
FIG. 13 is a perspective view of a bung cup to be used with the probe of FIG. 12 where the lockout protrusions are 30° from axial alignment with the locking pegs.

FIG. 12 and FIG. 13 illustrate an alternative embodiment of the lockout coupler of the invention, including probe assembly 120*a* and bung cup 800*a*. Similar parts are similarly labeled on probe assembly 120*a*. The indentations 320*a* are 30° from axial alignment with the locking pegs 340*a*. In the corresponding bung cup 800*a*, the mating lockout protrusion 920*a* is 30° from axial alignment with the locking channels 830*a*. Accordingly, the probe assembly 120*a* may be used with bung cup 800*a*, but could not be used with the bung cup 800 illustrated in FIG. 8.

In FIG. 4, the locking pegs 340 are in axial alignment with the indentations 320. Complementarily shaped bung cup 800, as seen in FIG. 9, has locking channels 830 which are in axial alignment with protrusions 920. This is in contrast to the probe 120*a* and bung cup 800*a* of FIG. 13, in which the lockout components are 30° from axial alignment. Consequently, bung cup 800 is complementarily shaped to match probe 120, while bung cup 800*a* is complementarily shaped to match probe 120*a*, so that each bung cup will accept only one probe. This is why they are described as complementarily shaped.

According to the invention, at least six different lockout configurations are possible on the probe assembly 120, where the indentations are provided at 30° intervals around the lower end of the probe assembly. The six different mating lockout configurations can also be provided in six different bung cups to be used with the invention, where the protrusion 920 is provided on the inner surface of the bung cup at six different positions, each separated by 30°.

To promote ease of use, matching probe and bung cups can be color-coded, or provided with similar colors, to facilitate identification of the matching pair. For example, a coupler where the locking pegs and indentations of the probe and the locking channels and protrusions of the bung cup are in axial alignment, the probe and bung cup can both be red. Where the lockout portions are 30° from axial alignment, the probe and bung cup can both be yellow.

FIG. 14 illustrates one possible environment for use of the geometric lockout couplers of the invention. Couplers 100 and 101 are seen generally here, including probe assemblies 120, 120*a* and bung cup 800, 800*a*. Barrels 1402, 1404 each contain a solution, where the two solutions are to be drawn into the dispenser 1410 and dispensed for use. The solutions will be drawn out of the barrels 1402, 1404 using dip tubes 1412, 1414 that reach from the bung cup 800 to the bottom area of the barrels 1402, 1404. The dip tubes 1412, 1414 are received in a lower portion 840 (shown in FIG. 1, for example) of the bung cup 800. During use, each probe assembly 120, 120*a* will be turned into the open position so that liquid can pass through. The threaded aperture 260 of the probe assemblies 120, 120*a* will be attached to supply lines 1406, 1408, leading to the dispenser 1410. When a vacuum is applied to the supply line at the dispenser, the solution will be drawn from the barrel to the dispenser, if the probe assembly is properly inserted into the bung cup, and if the probe assembly is in the open position.

Preferably, the couplers 100 and 101 are mutually incompatible. For example, coupler 100, which is used in the first barrel, can include a probe assembly 120 and bung cup 800 in which the corresponding indentations 320, protrusions 920, locking pegs 340 and locking channels 830 are in axial alignment. This embodiment can be seen in FIGS. 4 and 9, for example. Likewise, coupler 101 preferably includes a probe assembly 120*a* and bung cup 800*a* in which the corresponding lockout components are arranged 30° from axial alignment. This is illustrated in FIGS. 12 and 13, for example. Each barrel has a complementarily shaped bung cup suitable only for its specific probe assembly.

FIG. 14 is shown with only two chemical supplies for ease of illustration only. The dispenser of the invention can also be used with a substantially greater number of distinct chemicals. Various products may be dispensed or mixed using the geometric lockout couplers of the invention including ware washing detergents, cleaners used for plant equipment, boil-out compositions that remove soils and built up scale from process equipment, and many other products. Categories of compositions contemplated by the invention include polyphosphates in high pH solutions, chlorine with organics in solution, chlorine at high ionic strengths and physically incompatible or multi-phase compositions. The uses mentioned above are those recognized by those skilled in the art.

For example, cleaning compositions can be developed for use in hard, medium or soft water environments as described in copending U.S. patent application Ser. No. 09/285,369 titled "Apparatus for Dispensing Incompatible Chemicals to a Common Utilization Point", filed on Apr. 2, 1999 and incorporated by reference herein.

The foregoing description, examples and data are illustrative of the invention described herein, and they should not be used to unduly limit the scope of the invention or the claims. Since many embodiments and variations can be made while remaining within the spirit and scope of the invention, the invention resides wholly in the claims hereinafter appended.

We claim:

1. A geometric lockout coupler comprising:

a probe being capable of reversibly moving between an open position and a closed position, the open position permitting fluid to pass through the probe, wherein a portion of the probe rotates with respect to a remainder of the probe to move the probe between the open and closed positions; and a complementarily shaped bung cup sized and configured to accept the probe;

wherein the probe further comprises a geometric configuration comprising a plurality of indentations which cooperates with the complementarily shaped bung cup comprising a plurality of protrusions to permit complete insertion of the probe and to allow fluid to pass through the probe, wherein the indentations on the probe are necessary for achieving complete insertion of the probe into the bung cup; and wherein the probe further comprises a pair of locking pegs for receipt by channels of the bung cup to lock the probe into the bung cup, wherein the probe is configured such that the indentations align axially with the locking pegs.

2. The geometric lockout coupler of claim 1, wherein the probe comprises a pair of locking pegs for receipt by channels of the bung cup to lock the probe into the bung cup, wherein the probe is configured such that the indentations are 30° from axial alignment with the locking pegs.

3. The geometric lockout coupler of claim 1, wherein the probe comprises a pair of locking pegs for receipt by channels of the bung cup to lock the probe into the bung cup, wherein the probe is configured such that the indentations are 60° from axial alignment with the locking pegs.

4. A The geometric lockout coupler of claim 1, wherein the probe comprises a pair of locking pegs for receipt by channels of the bung cup to lock the probe into the bung cup, wherein the probe is configured such that the indentations are 90° from axial alignment with the locking pegs.

5. The geometric lockout coupler of claim 1, wherein the probe comprises a pair of locking pegs for receipt by channels of the bung cup to lock the probe into the bung cup, wherein the probe is configured such that the indentations are 120° from axial alignment with the locking pegs.

6. The geometric lockout coupler of claim 1, wherein the probe comprises a pair of locking pegs for receipt by channels of the bung cup to lock the probe into the bung cup, wherein the probe is configured such that the indentations are 150° from axial alignment with the locking pegs.

7. The geometric lockout coupler of claim 1, wherein the probe and complementary bung cup are color coded.

8. The geometric lockout coupler of claim 1, wherein the probe comprises glass filled polypropylene.

9. The geometric lockout coupler of claim 1, wherein the bung cup comprises high density polyethylene.

10. The geometric lockout coupler assembly of claim 1 wherein the probe comprises a pair of locking pegs to lock the probe into the bung cup, the locking pegs being positioned 180 degrees apart radially, the bung cup further comprising locking channels for receiving the locking pegs, the locking channels having an over-center portion.

11. A system for dispensing chemicals comprising:

a plurality of probes, each probe having an open position and a closed position, wherein the open position permits fluids to pass through the probe, wherein a portion of the probe rotates with respect to a remainder of the probe to move the probe between the open and closed positions, each probe having a lockout portion having a distinct geometric configuration; and a plurality of bung cups, wherein each bung cup is configured to completely receive the lockout portion of only one matching probe selected from the plurality of probes, wherein the bung cup is further configured to permit the matching probe to be turned to the open position; and wherein the distinct geometric configuration of each probe comprises a plurality of indentations which cooperate with each complementary shaped bung cup comprising a plurality of protrusions to permit complete insertion of each probe into each bung cup; wherein the indentations on each probe are necessary for achieving complete insertion of each probe into each bung cup.

12. The system for dispensing chemicals of claim 11, wherein each probe further comprises a pair of locking pegs, wherein each bung cup further comprises a pair of locking channels for receiving the locking pegs, further comprising:

a first probe of the plurality of probes having indentations axially aligned with the locking pegs; and a first bung cup of the plurality of bung cups having protrusions axially aligned with the locking channels.

13. The system for dispensing chemicals of claim 12, further comprising:

a second probe of the plurality of probes having the indentations positioned 30° from axial alignment with the locking pegs; and a second bung cup of the plurality of bung cups having the protrusions positioned 30° from axial alignment with the locking channels.

14. The system for dispensing chemicals of claims 13, further comprising:

a third probe of the plurality of probes having the indentations positioned 60° from axial alignment with the locking pegs; and a third bung cup of the plurality of bung cups having the protrusions positioned 60° from axial alignment with the locking channels.

15. The system for dispensing chemicals of claim 14, further comprising:

a fourth probe of the plurality of probes having the indentations positioned 90° from axial alignment with the locking pegs; and a fourth bung cup of the plurality of bung cups having the protrusions positioned 90° from axial alignment with the locking channels.

16. The system for dispensing chemicals of claim 15, further comprising:

a fifth probe of the plurality of probes having the indentations positioned 120° from axial alignment with the locking pegs; and a fifth bung cup of the plurality of bung cups having the protrusions positioned 120° from axial alignment with the locking channels.

17. The system for dispensing chemicals of claim 16, further comprising:

a sixth probe of the plurality of probes having the indentations positioned 150° from axial alignment with the locking pegs; and a sixth bung cup of the plurality of bung cups having the protrusions positioned 150° from axial alignment with the locking channels.

18. A geometric lockout coupler assembly comprising:

a probe comprising an inner probe and an outer probe, said inner probe and outer probe being capable of reversibly moving axially in relation to each other between an open position where fluid is permitted to pass through the probe and a closed position;

said inner probe comprising a hollow cylinder through which fluid may pass, and one or more windows which permit entry of said fluid when the probe is in the open position;

a complementarily shaped bung cup sized and configured to accept the probe;

wherein the probe further comprises a geometric configuration which cooperates with the complementarily shaped bung cup to permit insertion of the probe into the bung cup; wherein the geometric configuration of the probe comprises a plurality of indentations which cooperate with the complementarily shaped bung cup comprising a plurality of protrusions to permit complete insertion of the probe, wherein the indentations on the probe are necessary for achieving complete insertion of the probe into the bung cup.

19. A geometric lockout coupler comprising:

a probe comprising an inner probe and an outer probe;

said inner probe comprising a hollow cylinder through which fluid may pass, and one or more windows which permit entry of said fluid;

said inner probe further comprising a plurality of slider pegs;

said outer probe comprising a plurality of slider tracks which cooperate with said slider pegs to permit the outer probe to simultaneously move axially and radially on the inner probe, thereby reversibly opening said window to permit fluid to pass through the probe;

said outer probe further comprising a plurality of locking pegs; and a complementarily shaped bung cup sized and configured to accept the probe;

wherein the probe further comprises a geometric configuration comprising a plurality of indentations which cooperate with the complementarily shaped bung cup comprising a plurality of protrusions to permit complete insertion of the probe into the bung cup.

20. A geometric lockout probe comprising an inner probe and an outer probe;

said inner probe comprising a hollow cylinder through which fluid may flow, and one or more windows which permit entry of said fluid;

said inner probe further comprising a plurality of slider pegs;

said outer probe comprising a hollow cylinder comprising a plurality of slider tracks which cooperate with said slider pegs to permit the outer probe to simultaneously move axially and radially on the inner probe, thereby reversibly opening said window to permit fluid flow through the probe;

said outer probe further comprising a plurality of locking pegs and a plurality of indentations which are arranged at predetermined radial positions in relation to said locking pegs.

21. A geometric lockout coupler assembly comprising:

a probe comprising an inner probe and an outer probe, wherein said probe has a first end and a second end;

said first end comprising an engagement surface and a fluid exit point;

said second end comprising a fluid entrance point;

said inner probe comprising a hollow cylinder through which fluid may flow, and one or more windows which permit entry of said fluid, wherein said windows of said inner probe correspond with the fluid entrance point;

said inner probe further comprising a plurality of slider pegs;

said outer probe comprising a plurality of slider tracks which cooperate with said slider pegs to permit the outer probe to simultaneously move axially and radially on the inner probe, thereby reversibly revealing said windows to permit fluid flow through the probe;

said outer probe further comprising a plurality of locking pegs; and a complementarily shaped bung cup sized and configured to accept the probe;

wherein the probe further comprises a geometric configuration comprising a plurality of indentations which cooperate with the complementarily shaped bung cup comprising a plurality of protrusions to permit complete insertion of the probe.

* * * * *

UNITED STATES PATENT AND TRADEMARK OFFICE
CERTIFICATE OF CORRECTION

PATENT NO. : 6,196,522 B1
DATED : March 6, 2001
INVENTOR(S) : Yuen et al.

It is certified that error appears in the above-identified patent and that said Letters Patent is hereby corrected as shown below:

Title page,
Item [56], References Cited, U.S. PATENT DOCUMENTS, insert

| | | |
|---|---|---|
| -- 2,314,152 | 03/1943 | Mallory |
| 2,641,271 | 06/1953 | Pressler |
| 2,823,833 | 02/1958 | Bauerlein |
| 3,336,767 | 08/1967 | Mackenzie et al. |
| 3,444,242 | 05/1969 | Rue et al. |
| 3,726,296 | 04/1973 | Friedland et al. |
| 3,762,428 | 10/1973 | Beck et al. |
| 3,797,744 | 03/1974 | Smith |
| 4,020,865 | 05/1977 | Moffat et al. |
| 4,090,475 | 05/1978 | Kwan |
| 4,103,520 | 08/1978 | Jarvis et al. |
| 4,524,801 | 06/1985 | Magnasco et al. |
| 4,648,043 | 03/1987 | O'Leary |
| 4,691,850 | 09/1987 | Kirschmann et al. |
| 4,845,965 | 07/1989 | Copeland et al. |
| 4,858,449 | 08/1989 | Lehn |
| 4,932,227 | 06/1990 | Hogrefe |
| 4,941,596 | 07/1990 | Marty et al. |
| 4,964,185 | 10/1990 | Lehn |
| 4,976,137 | 12/1990 | Decker et al. |
| 5,014,211 | 05/1991 | Turner et al. |
| 5,085,352 | 02/1992 | Sasaki et a.l. |
| Des. 326,503 | 05/1992 | Ipsen |
| Des. 328,200 | 07/1992 | Ipsen |
| 5,139,182 | 08/1992 | Appla |
| 5,181,632 | 01/1993 | Latter |
| 5,195,203 | 03/1993 | Blom et al. |
| 5,203,366 | 04/1993 | Czeck et al. |
| 5,246,026 | 09/1993 | Proudman |
| 5,246,140 | 09/1993 | Thix et al. |
| 5,507,419 | 04/1996 | Martin et al. |
| 5,597,021 | 01/1997 | Crossdale et al. |
| 5,597,093 | 01/1997 | Lee |
| 5,611,459 | 03/1997 | Hinch |
| 5,617,977 | 04/1997 | Augustinus |
| 5,632,420 | 05/1997 | Lohrman et al. |
| 5,636,762 | 06/1997 | Juhola et al. |
| 5,641,094 | 06/1997 | Wunsch |

UNITED STATES PATENT AND TRADEMARK OFFICE

CERTIFICATE OF CORRECTION

PATENT NO. : 6,196,522 B1
DATED : March 6, 2001
INVENTOR(S) : Yuen et al.

It is certified that error appears in the above-identified patent and that said Letters Patent is hereby corrected as shown below:

| | | |
|---|---|---|
| 5,647,416 | 07/1997 | Desrosiers et al. |
| 5,660,306 | 08/1997 | Kim |
| 5,678,737 | 10/1997 | White |
| 5,709,318 | 01/1998 | Oder |
| 5,711,355 | 01/1998 | Kowalczyk |
| 5,713,493 | 02/1998 | Garibaldi |
| 5,713,496 | 02/1998 | Ipsen |
| 5,725,132 | 03/1998 | Foster et al. |
| 5,746,238 | 05/1998 | Brady et al. |
| | FOREIGN PATENT DOCUMENTS | |
| 0403 296 B1 | 12/1990 | European Patent Office -- |

<u>Column 7,</u>
Line 4, "300" should read -- 30º --

<u>Column 10,</u>
Line 45, delete "A"

<u>Column 11,</u>
Line 43, "claims" should read -- claim --

Signed and Sealed this

Twenty-seventh Day of August, 2002

*Attest:*

JAMES E. ROGAN

*Attesting Officer*

*Director of the United States Patent and Trademark Office*